United States Patent
Kubota et al.

(10) Patent No.: US 12,469,247 B2
(45) Date of Patent: Nov. 11, 2025

(54) ENDOSCOPE PROCESSOR, ENDOSCOPE DEVICE, AND METHOD OF GENERATING DIAGNOSTIC IMAGE

(71) Applicant: OLYMPUS MEDICAL SYSTEMS CORP., Tokyo (JP)

(72) Inventors: Akihiro Kubota, Hachioji (JP); Yamato Kanda, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 123 days.

(21) Appl. No.: 18/382,556

(22) Filed: Oct. 23, 2023

(65) Prior Publication Data
US 2024/0046599 A1 Feb. 8, 2024

Related U.S. Application Data

(63) Continuation of application No. PCT/JP2021/025365, filed on Jul. 5, 2021.

(51) Int. Cl.
*G06T 7/00* (2017.01)
*G06V 10/25* (2022.01)

(52) U.S. Cl.
CPC ............ *G06V 10/25* (2022.01); *G06T 7/0012* (2013.01); *G06T 2207/10068* (2013.01);
(Continued)

(58) Field of Classification Search
CPC ... A61B 1/00009; A61B 1/0005; A61B 1/043; A61B 1/0638; A61B 1/00078;
(Continued)

(56) References Cited

U.S. PATENT DOCUMENTS 6,293,911 B1 * 9/2001 Imaizumi ............. A61B 5/0071
600/178
6,527,708 B1 * 3/2003 Nakamura ........... A61B 1/0005
600/109
(Continued)

FOREIGN PATENT DOCUMENTS

EP 3391805 A1 10/2018
EP 3633987 A1 4/2020
(Continued)

OTHER PUBLICATIONS

International Search Report dated Sep. 7, 2021 issued in PCT/JP2021/025365.

*Primary Examiner* — Frank F Huang
(74) *Attorney, Agent, or Firm* — Scully, Scott, Murphy & Presser, P.C.

(57) ABSTRACT

An endoscope processor includes a processor. The processor detects a first region of a lesion candidate from first image information which is acquired by irradiation with first illumination light; detects a second region of a lesion candidate from second image information acquired by irradiation with second illumination light having a different spectrum from the first illumination light; selects a region for display of the lesion candidate out of the first region and the second region, corresponding to an observation target site of a subject; and generates image information for display, in which the region for display is superimposed on the first image information.

20 Claims, 9 Drawing Sheets

(52) U.S. Cl.
CPC ............ *G06T 2207/10152* (2013.01); *G06T 2207/30096* (2013.01); *G06V 2201/03* (2022.01)

(58) Field of Classification Search
CPC ............ A61B 1/00105; A61B 1/00114; A61B 1/00117; A61B 1/042; A61B 1/063; A61B 1/0646; A61B 1/0669; A61B 1/0684; A61B 1/000094; A61B 1/00186; H04N 5/2256; H04N 5/23229; H04N 5/272; H04N 7/18; H04N 2005/2255; G06K 9/6201; G06T 1/00

See application file for complete search history.

(56) References Cited

U.S. PATENT DOCUMENTS

| | | | |
|---|---|---|---|
| 10,602,918 B2 * | 3/2020 | King | A61B 1/0638 |
| 10,646,110 B2 * | 5/2020 | Fukuda | A61B 1/00009 |
| 2003/0231791 A1 * | 12/2003 | Torre-Bueno | G06T 5/50 |
| | | | 382/133 |
| 2004/0245350 A1 * | 12/2004 | Zeng | A61B 1/042 |
| | | | 236/77 |
| 2006/0256191 A1 * | 11/2006 | Iketani | A61B 1/0005 |
| | | | 348/65 |
| 2011/0254937 A1 | 10/2011 | Yoshino | |
| 2012/0183198 A1 * | 7/2012 | Zahniser | G06T 7/0014 |
| | | | 382/133 |
| 2018/0289246 A1 | 10/2018 | Tabata et al. | |
| 2020/0069160 A1 | 3/2020 | Oosake | |

FOREIGN PATENT DOCUMENTS

| | | |
|---|---|---|
| JP | 2011224038 A | 11/2011 |
| JP | 2012005512 A | 1/2012 |
| JP | 2013017769 A | 1/2013 |
| JP | 6752958 B2 | 9/2020 |
| JP | 6785990 B2 | 11/2020 |
| JP | 6957771 B2 | 11/2021 |
| WO | 2017104046 A1 | 6/2017 |
| WO | 2018221033 A1 | 12/2018 |
| WO | 2019083019 A1 | 5/2019 |
| WO | 2019087971 A1 | 5/2019 |
| WO | 2020008834 A1 | 1/2020 |
| WO | 2020017213 A1 | 1/2020 |
| WO | 2020110214 A1 | 6/2020 |

* cited by examiner

FIG. 5

| DEVICE | IMAGE INFORMATION |
|---|---|
| WHITE LIGHT IDENTIFICATION DEVICE | |
| FIRST SPECIAL LIGHT IDENTIFICATION DEVICE | |
| SECOND SPECIAL LIGHT IDENTIFICATION DEVICE | |
| MONITOR | |

ENDOSCOPE PROCESSOR, ENDOSCOPE DEVICE, AND METHOD OF GENERATING DIAGNOSTIC IMAGE

CROSS REFERENCE TO RELATED APPLICATION

This application is a continuation application of PCT/JP2021/025365 filed on Jul. 5, 2021, the entire contents of which are incorporated herein by this reference.

BACKGROUND OF THE INVENTION

1. Field of the Invention

The present invention relates to an endoscope processor configured to detect a lesion region from image information, an endoscope device, and a method of generating a diagnostic image.

2. Description of the Related Art

Conventionally, endoscopes have been widely used in medical and industrial fields. For example, when an endoscope is used in the medical field, an operator can view an endoscope image of the inside of a subject, which is displayed on a display device, find and discriminate a lesion portion, and perform treatment on the lesion portion using a treatment instrument.

In recent years, computer-aided image diagnosis (CAD: computer aided detection/diagnosis) has been developed which quantitatively analyzes an endoscope image with a computer, and displays a position, discrimination information and the like of a lesion candidate on the endoscope image, in order to prevent an operator from overlooking a lesion portion and facilitate diagnosis. An endoscope device has been proposed that notifies the operator of the presence of a lesion portion and a position where the lesion portion exists by highlighting (for example, displaying a marker such as a frame) on the endoscope image when the lesion portion is found by the CAD.

For example, International Publication No. 2019/087971 discloses a medical image processing apparatus and an endoscope device for detecting a lesion region with a first illumination light, discriminating a type of lesion with a second illumination light, and specifying a degree of progress with a third illumination light.

SUMMARY OF THE INVENTION

An endoscope processor according to one aspect of the present invention includes a processor, wherein the processor detects a first region of a lesion candidate from first image information which is acquired by irradiation with first illumination light; detects a second region of a lesion candidate from second image information acquired by irradiation with second illumination light having a different spectrum from the first illumination light; selects a region for display of the lesion candidate out of the first region and the second region, corresponding to an observation target site of a subject; and generates image information for display, in which the region for display is superimposed on the first image information.

An endoscope device according to one aspect of the present invention includes: a light source device that can emit a plurality of types of illumination light, which include first illumination light and second illumination light having a different spectrum from the first illumination light; an endoscope that includes an image pickup apparatus configured to acquire first image information on the first illumination light radiated from the light source device and acquire second image information on the second illumination light radiated from the light source device; an endoscope processor that includes a processor configured to detect a first region of a lesion candidate from the first image information, detect a second region of a lesion candidate from the second image information, select a region for display of the lesion candidate out of the first region and the second region, corresponding to an observation target site of a subject, and generate image information for display, in which the region for display is superimposed on the first image information; and a monitor configured to display the image information for display.

A method of generating a diagnostic image according to one aspect of the present invention includes: detecting a first region of a lesion candidate from first image information that is acquired by irradiation with first illumination light; detecting a second region of a lesion candidate from second image information acquired by irradiation with second illumination light having a different spectrum from the first illumination light; selecting a region for display of the lesion candidate out of the first region and the second region, corresponding to an observation target site of a subject; and generating image information for display, in which the region for display is superimposed on the first image information.

BRIEF DESCRIPTION OF THE DRAWINGS

FIG. 5 is a diagram showing an example of image information in each identification device and its monitor in the above first embodiment;

DETAILED DESCRIPTION OF THE PREFERRED EMBODIMENTS

Figure 1:
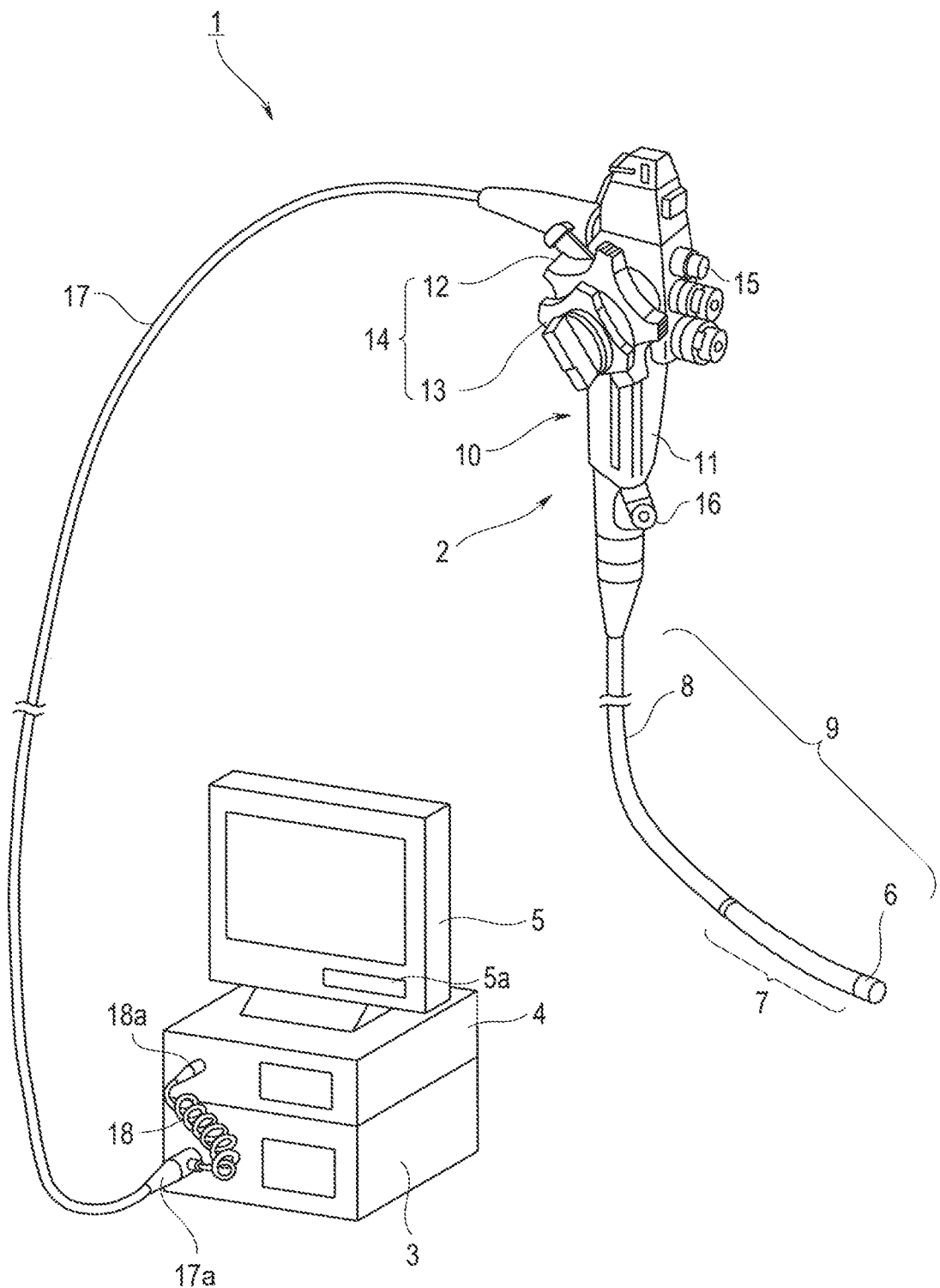
FIG. 1 is a perspective view showing one example of an external appearance of an endoscope device according to a first embodiment of the present invention.

Embodiments of the present invention will be described below with reference to the drawings. However, the present invention is not limited to the embodiments which will be described below. Note that in the description of the drawings, the same or corresponding elements are appropriately denoted by the same reference characters.

First Embodiment

FIG. 1 to FIG. 6 show a first embodiment of the present invention, and FIG. 1 is a perspective view showing one example of a configuration of an endoscope device 1. The endoscope device 1 of the present embodiment includes: an endoscope 2; a light source device 3; an endoscope processor 4; and a monitor 5.

The endoscope 2 includes: an elongated insertion portion 9 to be inserted into a subject; an operation portion 10 for performing various operations related to the endoscope 2; and a universal cable 17 for connecting the endoscope 2 to the light source device 3 and the endoscope processor 4.

The insertion portion 9 includes a distal end portion 6, a bending portion 7 and a flexible tube portion 8, in order from a distal end toward a proximal end side. The distal end portion 6 includes an illumination window through which illumination light is emitted to a subject and an observation window through which return light from the subject is incident, though the illustration is omitted. The endoscope 2 of the present embodiment is configured as an electronic endoscope, and an image pickup apparatus 21 (refer to FIG. 2) is provided at the distal end portion 6. The image pickup apparatus 21 includes an image pickup optical system and an image pickup device. The image pickup optical system forms an image of light incident from the observation window on the image pickup device, as an optical image of an object (object image). The image pickup device is an image sensor such as CCD (charge coupled device) or CMOS (complementary metal oxide semiconductor). The image pickup device photoelectrically converts the object image, and generates and outputs an image pickup signal. The image pickup signal is transmitted to the endoscope processor 4 through a signal line.

The bending portion 7 is a bendable portion which is connected to a proximal end side of the distal end portion 6, and changes a direction to which the distal end portion 6 faces, by being bent. By changing the direction of the distal end portion 6, the observation site of the subject is changed, or insertability of the endoscope 2 is enhanced.

The flexible tube portion 8 is a portion that is connected to a proximal end side of the bending portion 7 and has flexibility.

A bending wire for bending the bending portion 7 and a treatment instrument channel for allowing insertion of a treatment instrument are arranged in the insertion portion 9 and the operation portion 10. In the insertion portion 9, the operation portion 10 and the universal cable 17 of the endoscope 2, the above-described signal line that is connected to the image pickup device, and a light guide for transmitting illumination light are arranged.

In the operation portion 10, there are provided a bending operation portion 14 for bending the bending portion 7 through the bending wire, various switches including a focus switch 15, and the like. In a case where the image pickup optical system includes a variable magnification optical system, a focus position is changed to a near point or a far point by an operation of the focus switch 15, and magnification of a subject image is changed. The bending operation portion 14 includes: a UD bending operation knob 12 for bending the bending portion 7 in a vertical direction; and an RL bending operation knob 13 for bending the bending portion 7 in a horizontal direction. The bending portion 7 can also be bent in an oblique direction, by a combination of bending in the vertical direction and bending in the horizontal direction.

On a distal end side of the operation portion 10, there are provided a grasping portion 11 for an operator so as to grasp the endoscope 2 with his/her hand, and an insertion port 16 of a treatment instrument channel, which serves as an opening on a proximal end side of the above-described treatment instrument channel.

The universal cable 17 extends from, for example, a side face on a proximal end side of the operation portion 10. A scope connector 17a is provided at a proximal end of the universal cable 17. The scope connector 17a removably connects the endoscope 2 to the light source device 3. By connecting the scope connector 17a to the light source device 3, illumination light can be transmitted by the light guide.

A coiled electric cable 18 is extended from a side face of the scope connector 17a. An electric connector 18a provided at an extension end of the electric cable 18 is removably connected to the endoscope processor 4. By connecting the electric connector 18a to the endoscope processor 4, the image pickup device is electrically connected to the endoscope processor 4.

The endoscope processor 4 is electrically connected to the monitor 5 which is a display device. The endoscope processor 4 processes the image pickup signal outputted from the image pickup device of the endoscope 2 and generates image information for display. The image information for display is outputted from the endoscope processor 4 to the monitor 5, and is displayed on the monitor 5 as a display image including an endoscope image. The monitor 5 includes a speaker 5a configured to output voice.

Figure 2:
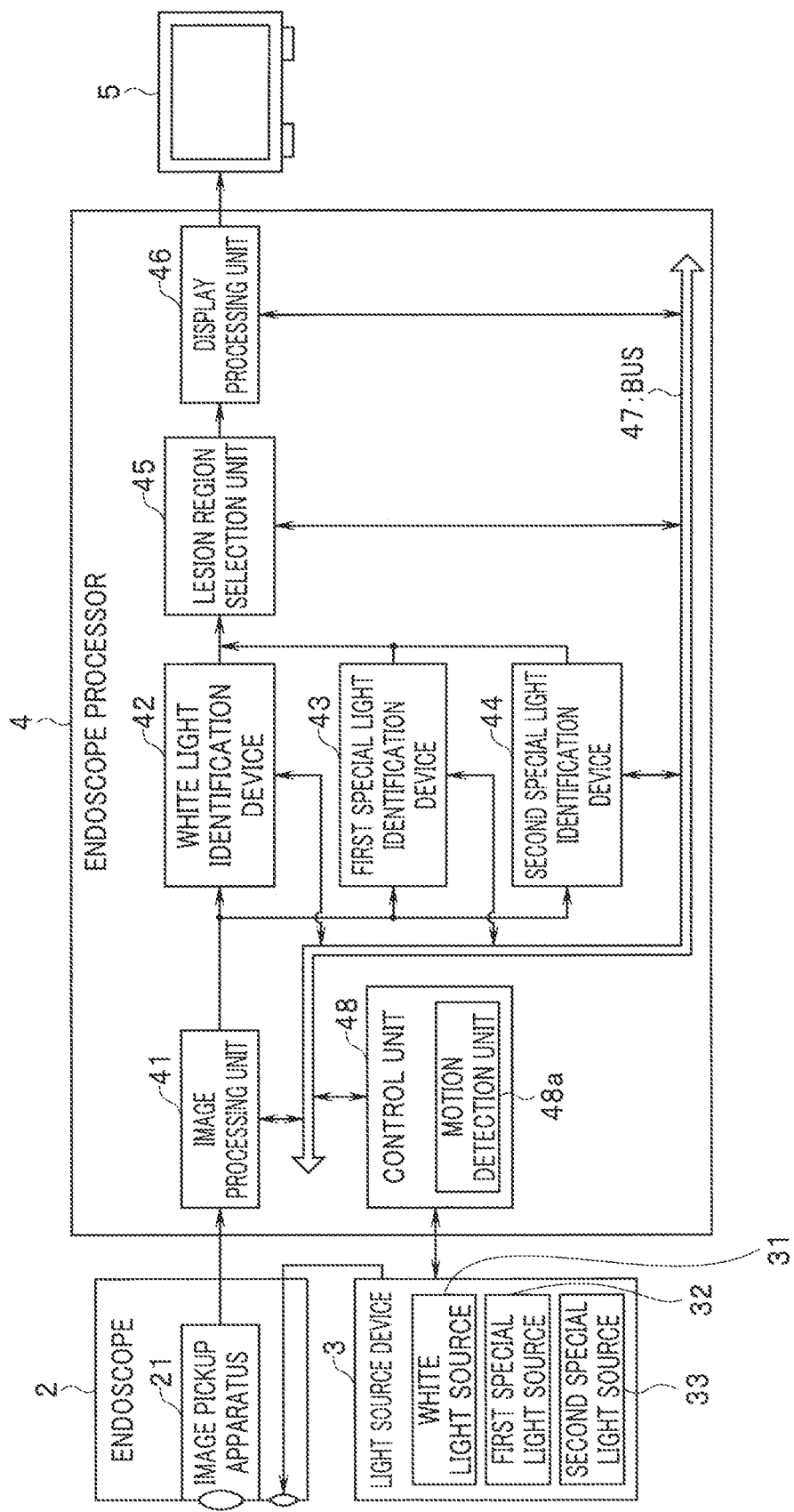
FIG. 2 is a block diagram showing one example of a configuration of the endoscope device according to the above first embodiment.

FIG. 2 is a block diagram illustrating one example of a configuration of the endoscope device 1.

As described above, the endoscope 2 includes the image pickup apparatus 21. The image pickup apparatus 21 acquires first image information (white light image information which will be described later), by picking up an image of the subject irradiated with the first illumination light emitted from the light source device 3, and acquires second image information (first special light image information and second special light image information which will be described later) by picking up an image of the subject irradiated with the second illumination light emitted from the light source device 3.

The light source device 3 can emit a plurality of types of illumination light, which include: the first illumination light; and the second illumination light having a different spectrum from the first illumination light. The light source device 3 of the present embodiment includes a white light source 31, a first special light source 32, and a second special light source 33. The white light source 31 emits white light for observation. The first special light source 32 emits first special light having a different spectrum from the spectrum of the white light. The second special light source 33 emits second special light having a different spectrum from spectra of the white light and the first special light. The white light is the first illumination light, and the first special light and the second special light are the second illumination light.

More specifically, the light source device 3 includes a plurality of light sources that emit light of respective colors such as R (red), G (green), B (blue), V (violet) and A (amber), and constitute the white light source 31, the first special light source 32, and the second special light source 33 described above, by combining the respective color light sources.

The light source device 3 includes, for example, a light emitting device such as an LED (light emitting diode) or an LD (laser diode). As one example, the light source device 3 includes a V-LED that emits violet (V) light having a center wavelength of approximately 405 nm, a B-LED that emits blue (B) light having a center wavelength of approximately 445 nm, a G-LED that emits green (G) light having a center wavelength of approximately 540 nm, and an R-LED that emits red (R) light having a center wavelength of approximately 630 nm. The light source device 3 includes a prism, a mirror, an optical fiber, or an optical filter that adjusts a wavelength band, a light amount or the like, as necessary.

The light source device 3 of the present embodiment sequentially emits, for example, white light, first special light, and second special light, for each frame. Thereby, the image pickup apparatus 21 repeatedly acquires white light image information (hereinafter referred to as a white light image), first special light image information (hereinafter referred to as a first special light image), and second special light image information (hereinafter referred to as a second special light image) in this order, and then acquires another white light image after the second special light image. However, it is acceptable that each image is not limited to being acquired in one frame, but any image is acquired in a plurality of frames. For example, the white light image and the first special light image are each acquired in one frame, but the second special light image is acquired in two frames, and the like.

The endoscope processor 4 includes an image processing unit 41, a white light identification device 42, a first special light identification device 43, a second special light identification device 44, a lesion region selection unit 45, a display processing unit 46, a bus 47, and a control unit 48.

Note that in FIG. 2 three identification devices are provided which are the white light identification device 42, the first special light identification device 43 and the second special light identification device 44, but two, or four or more identification devices may be provided. It is also acceptable that a single identification device having a plurality of identification functions is provided and is configured to function as any one of the white light identification device 42, the first special light identification device 43, and the second special light identification device 44, by switching the identification functions.

Figure 3:
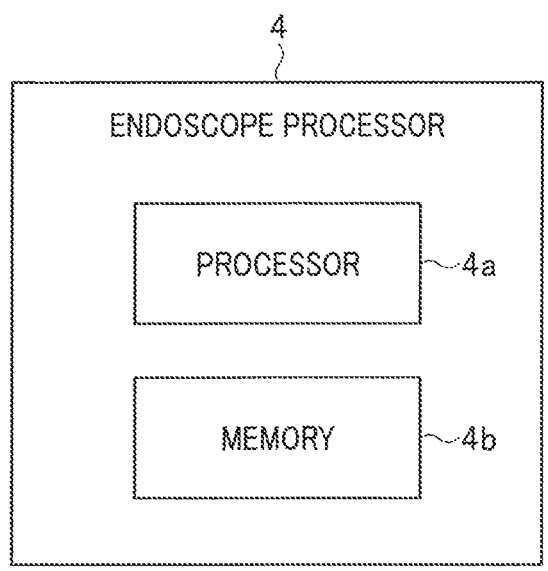
FIG. 3 is a block diagram showing an example of an electrical configuration of an endoscope processor according to the above first embodiment.

FIG. 3 is a block diagram showing an example of an electrical configuration of the endoscope processor 4. In FIG. 2, a functional configuration of the endoscope processor 4 is shown; but as the electrical configuration, the endoscope processor 4 includes, for example, a processor 4a and a memory 4b.

The processor 4a includes, for example, an ASIC (application specific integrated circuit) including CPU (central processing unit) and the like, or an FPGA (field programmable gate array). The memory 4b is a storage medium such as a RAM (random access memory), a flash memory, or a disk storage medium. The memory 4b includes a non-transitory computer-readable storage medium that records a processing program.

The processor 4a reads and executes the processing program that is stored in the memory 4b, and thereby performs the functions of the respective units shown in FIG. 2. However, the present invention is not limited to the configuration, and the processor 4a may be configured as a dedicated electronic circuit that performs the function of each unit.

Figure 4:
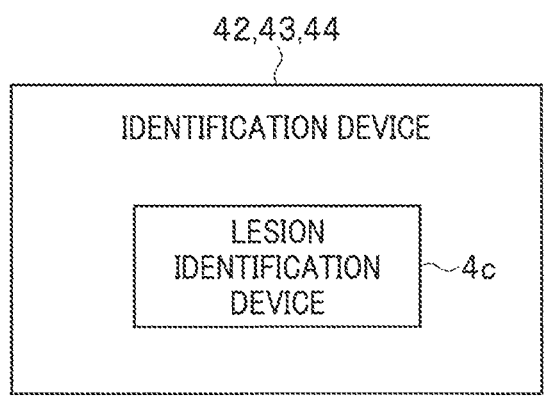
FIG. 4 is a block diagram showing a configuration example of an identification device according to the above first embodiment.

FIG. 4 is a block diagram showing a configuration example of the identification devices 42, 43 and 44. Any of the white light identification device 42, the first special light identification device 43 and the second special light identification device 44 includes a lesion identification device 4c that detects a region of a lesion candidate from image information acquired by irradiation with illumination light. The lesion identification device 4c includes, for example, artificial intelligence (AI) that has learned lesion images.

The image processing unit 41 subjects the image information outputted from the image pickup apparatus 21 to various processes such as demosaicking, noise correction, color correction, contrast correction and gamma correction; and converts the image information into image signals (image information for display) in a format that can be outputted to the monitor 5.

The white light identification device 42 is a first identification device, and the first special light identification device 43 and the second special light identification device 44 are second identification devices.

The white light identification device 42 includes an AI that has learned the lesion image which has been picked up as a white light image, by machine learning, deep learning or the like. The white light identification device 42 detects a lesion candidate region (first region of a lesion candidate) from the endoscope image (white light image) that the image pickup apparatus 21 has acquired from the white light which has been emitted from the white light source 31 and with which the subject has been irradiated. The white light identification device 42 calculates a reliability score of the detected lesion candidate region. The reliability score indicates such a probability (certainty factor) that the lesion candidate region is actually a lesion.

The first special light identification device 43 includes an AI that has learned the lesion image which has been picked up as a first special light image, by machine learning, deep learning or the like. The first special light identification device 43 detects a lesion candidate region (second region of a lesion candidate) from the endoscope image (first special light image) that the image pickup apparatus 21 has acquired from the first special light which has been emitted from the first special light source 32 and with which the subject has been irradiated. The first special light identification device 43 calculates a reliability score of the detected lesion candidate region.

The second special light identification device 44 includes an AI that has learned the lesion image which has been picked up as a second special light image, by machine learning, deep learning or the like. The second special light identification device 44 detects a lesion candidate region (second region of a lesion candidate) from the endoscope image (second special light image) that the image pickup apparatus 21 has acquired from the second special light which has been emitted from the second special light source 33 and with which the subject has been irradiated. The second special light identification device 44 calculates a reliability score of the detected lesion candidate region.

The first special light identification device 43 and the second special light identification device 44 can be configured, for example, as identification devices that detect lesion candidate regions at positions (surface layer, middle layer, and deep layer) the depths from the mucosal surface of which are different. The lesion candidate region is detected based on, for example, an image which emphasizes blood vessel information at a target depth. As the special light for emphasizing the blood vessel information, for example, a set (a wavelength set of narrowband light optimal for calculating a degree of saturation of oxygen in the blood vessel at each depth of the surface layer, the middle layer and the deep layer) is selected, which includes a wavelength of narrowband light that sufficiently reaches a target depth and shows a difference in absorption coefficients µa between oxygenated hemoglobin and reduced hemoglobin, and a wavelength of narrowband light at an isosbestic point, which does not show the difference. Illumination light of such a wavelength set is known as illumination light for NBI (narrow band imaging).

An identification device for a surface layer type lesion identifies a mucosal surface, or a surface layer type lesion, the depth from the mucosal surface of which is relatively shallow (the depth of which is about several tens of micrometers from the mucosal surface). The special light that emphasizes a surface layer type of blood vessel information is, for example, the light that includes violet light (405 nm) as reference light, and blue light (445 nm) as measurement light, and in which the light amount of the violet light is larger than the light amount of the blue light. The identification device for the surface layer type lesion is an identification device that has been trained with lesion images which have been picked up with the special light that emphasizes the surface layer type of blood vessel information.

The identification device for a middle layer type lesion identifies the middle layer type lesion, the depth from the mucosal surface of which is a medium degree (the depth of which is several tens to several hundreds of m). The special light for emphasizing the middle layer type of blood vessel information includes, for example, the light that includes blue light (473 nm) as the measurement light, green light as the reference light, and red light as the reference light, and in which the light amount of the blue light is larger than the light amount of the green light, and the light amount of the green light is larger than the light amount of the red light. The identification device for the middle layer type lesion is an identification device that has been trained with lesion images which have been picked up with special light that emphasizes the middle layer type of blood vessel information.

An identification device for a deep layer type lesion identifies a deep layer type lesion, the depth from the mucosal surface of which is deep (the depth of which is from the muscularis mucosae to the submucosal tissue layer). The identification device for the deep layer type lesion is an identification device or the like which has been trained with lesion images picked up with special light that is the special light which emphasizes the deep layer type of blood vessel information, and includes, for example, blue light as the reference light, green light as the reference light, and red light (630 nm) as the measurement light, and in which the light amount of green light is larger than the light amount of blue light, and the light amount of blue light is larger than the light amount of red light.

Note that the identification devices of lesions, the depths from the mucosal surface of which are different, have been described as an example of the second identification device (the first special light identification device 43 and the second special light identification device 44), but the second identification devices are not limited to the example. The second identification device may be, for example, an identification device that has been trained with lesion images which have been picked up with special light (illumination light for RDI (red dichromatic imaging)) that passes through an obstacle in detection of a lesion candidate region when picked up with white light, such as residue or bile on a mucous membrane, or blood on the mucous membrane due to bleeding. As the illumination light for RDI, for example, the light is used which includes specific wavelengths of three colors of green, amber and red. Accordingly, the plurality of types of second illumination light may include at least one of the illumination light for NBI and the illumination light for RDI.

Note that the present embodiment is described in such a way that the first special light identification device 43 is the identification device for the surface layer type lesion, and the second special light identification device 44 is the identification device for the middle layer type lesion, as one example.

The lesion region selection unit 45 selects a region for display of a lesion candidate, based on a lesion candidate region that has been detected by the white light identification device 42, a lesion candidate region that has been detected by the first special light identification device 43, and a lesion candidate region that has been detected by the second special light identification device 44.

As methods for selecting the region for display by the lesion region selection unit 45, the following methods of (1) to (3) can be used, for example. Each of the methods (1) to (3) which will be described below is a method of: calculating a plurality of reliability scores including a reliability score of a lesion candidate region (first region) of a white light image, a reliability score of a lesion candidate region (second region) of a first special light image, and a reliability score of a lesion candidate region (second region) of a second special light image; and selecting a region for display, based on the plurality of reliability scores.

In the following, the lesion candidate region detected by the white light identification device 42 is referred to as a region 1, the lesion candidate region detected by the first special light identification device 43 is referred to as a region 2, and the lesion candidate region detected by the second special light identification device 44 is referred to as a region 3. Note that regarding the region 1, there is a case where a lesion candidate is not detected and the region 1 does not exist, and there is a case where one or a plurality of lesion candidates are detected in one image, and one or a plurality of regions 1 exist. Similarly to the region 1, also in the regions 2 and 3, there is a case where there exist zero, one, or a plurality of regions.

(1) The lesion region selection unit 45 firstly extracts a region, the reliability score of which is a predetermined threshold value (specified value) or larger, among the regions 1 to 3, and when there are a plurality of regions in which the positions overlap among the extracted regions, merges all the regions, and selects the merged region as the region for display. When there are regions in which the positions do not overlap among the extracted regions, the lesion region selection unit 45 selects the regions as the regions for display as the regions are.

(2) The lesion region selection unit 45 firstly extracts a region, the reliability score of which is a predetermined threshold value (specified value) or larger, among the regions 1 to 3, and when there are a plurality of regions in which the positions overlap among the extracted regions, selects a region, the reliability score of which is highest, as the region for display. When there are regions in which the positions do not overlap among the extracted regions, the lesion region selection unit 45 selects the regions as the regions for display as the regions are.

(3) The lesion region selection unit 45 assigns weights to the reliability scores corresponding to the observation target site (organ to be subjected to endoscopic examination) of the subject, applies the method (2) based on the weighted reliability score, and selects the region for display.

The method (3) will be further described below. In the following, the reliability score of the region 1 is referred to as a score 1, the reliability score of the region 2 is referred to as a score 2, and the reliability score of the region 3 is referred to as a score 3, as appropriate. A weight coefficient by which the score 1 is multiplied is referred to as a weight coefficient 1, a weight coefficient by which the score 2 is multiplied is referred to as a weight coefficient 2, and a weight coefficient by which the score 3 is multiplied is referred to as a weight coefficient 3.

As for organs such as the esophagus and the large intestine, a diagnostic method is being established which uses an image picked up with the special light that emphasizes the surface layer type of blood vessel information. Then, in a case where the organ is the esophagus or the large intestine, the lesion region selection unit 45 sets the weight coefficient 2 so as to be larger than the weight coefficient 1 and the weight coefficient 3, applies the method (2), and selects the region for display. At the time, if the weight coefficient 1 and the weight coefficient 3 are set to 0, only the region 2 results in being selected as an object, which has been detected by the first special light identification device 43 that is an identification device of the surface layer type lesion, and the operation is the same as an operation of selecting the first special light identification device 43 as the identification device.

In a case where the organ is the stomach and the lesion is a scirrhous gastric cancer, a diagnostic method is being established which uses an image picked up with the special light that emphasizes a middle layer type of blood vessel information. Then, in a case where the organ is the stomach, the lesion region selection unit 45 sets the weight coefficient 3 so as to be larger than the weight coefficient 1 and the weight coefficient 2, applies the method (2), and selects the region for display. At the time, if the weight coefficient 1 and the weight coefficient 2 are set to 0, only the region 3 results in being selected as an object, which has been detected by the second special light identification device 44 that is an identification device of the middle layer type lesion, and the operation is the same as an operation of selecting the second special light identification device 44 as the identification device.

Accordingly, it differs depending on the organ which one is selected as the region for display, among the lesion candidate region of the white light image (first region), the lesion candidate region of the first special light image (second region), and the lesion candidate region of the second special light image (second region).

The assignment of the weight corresponding to the organ may be switched according to a user instruction (in other words, manually); may be automatically switched by the control unit 48 which determines the assignment of the weight based on the feature of the endoscope image; may be automatically switched by the control unit 48 which detects an insertion length of the insertion portion 9 of the endoscope 2 and determines the assignment of the weight based on the detection result; or may be automatically switched by the control unit 48 which determines the assignment of the weight based on a detection result of a position detection sensor which is incorporated in the distal end portion 6 of the endoscope 2.

The white light image is transmitted from the image processing unit 41 to the display processing unit 46, through the white light identification device 42 and the lesion region selection unit 45. Furthermore, the region for display selected by the lesion region selection unit 45 is transmitted to the display processing unit 46.

The bus 47 is a transmission channel through which each unit in the endoscope processor 4 transmits and receives commands and information.

The control unit 48 is connected to the image processing unit 41, the white light identification device 42, the first special light identification device 43, the second special light identification device 44, the lesion region selection unit 45 and the display processing unit 46, through the bus 47, and controls the units and the devices.

The control unit 48 includes a motion detection unit 48a. The motion detection unit 48a detects the motion of the white light image, the first special light image and the second special light image. The control unit 48 may detect the motion, for example, by image analysis, or may detect the motion based on a detection result of an acceleration sensor or the above-described position detection sensor, which has been incorporated in the distal end portion 6 of the endoscope 2.

The motion of the image occurs due to the movement of the image pickup apparatus 21 relative to the subject, which is provided at the distal end portion 6 of the endoscope 2. Types of the motion of the image include: for example, movement in the vertical direction and the horizontal direction on the screen; rotation movement of the image pickup apparatus 21 relative to the subject; and movement of expansion/contraction of an image due to approach/separation of the distal end portion 6 to/from the subject (or due to variable magnification in a case where the image pickup apparatus 21 includes a variable magnification optical system). The control unit 48 transmits motion information of the image detected by the motion detection unit 48a, to the lesion region selection unit 45 and the display processing unit 46.

Based on the motion information of the images transmitted from the control unit 48, the lesion region selection unit 45 aligns the images with each other (corrects positional displacement), (accordingly, aligns the lesion candidate regions in the images with each other), and then selects a region for display from among regions 1 to 3.

The display processing unit 46 aligns the region for display with the white light image based on the motion information of the image transmitted from the control unit 48. However, it is also acceptable that the lesion region selection unit 45 aligns the region for display with the white light image. The display processing unit 46 generates image information for display by superimposing the region for display on the white light image, and outputs the generated image information for display to the monitor 5. Note that the region for display to be superimposed on the white light image may be, for example, a contour line of a merged region, or may be a marker (for example, a rectangular frame) which indicates a range of the merged region.

The monitor 5 displays a display image on a monitor screen, according to the image information for display, which has been inputted from the display processing unit 46.

FIG. 5 is a diagram showing an example of image information in each of identification devices 42, 43 and 44, and the monitor 5.

The white light identification device 42 detects a lesion candidate region 51a from a white light image 51.

The first special light identification device 43 detects a lesion candidate region 52a from a first special light image 52.

The second special light identification device 44 detects a lesion candidate region 53*a* from a second special light image 53.

The monitor 5 displays on the monitor screen a display image 50 on which a region for display 50*a* is superimposed. Here, the region for display 50*a* is, for example, a region obtained by merging of the lesion candidate region 51*a*, the lesion candidate region 52*a* and the lesion candidate region 53*a*. Note that the display of a discrimination result 50*b* and a degree of progress 50*c* shown in FIG. 5 will be described in a later embodiment.

Figure 6:
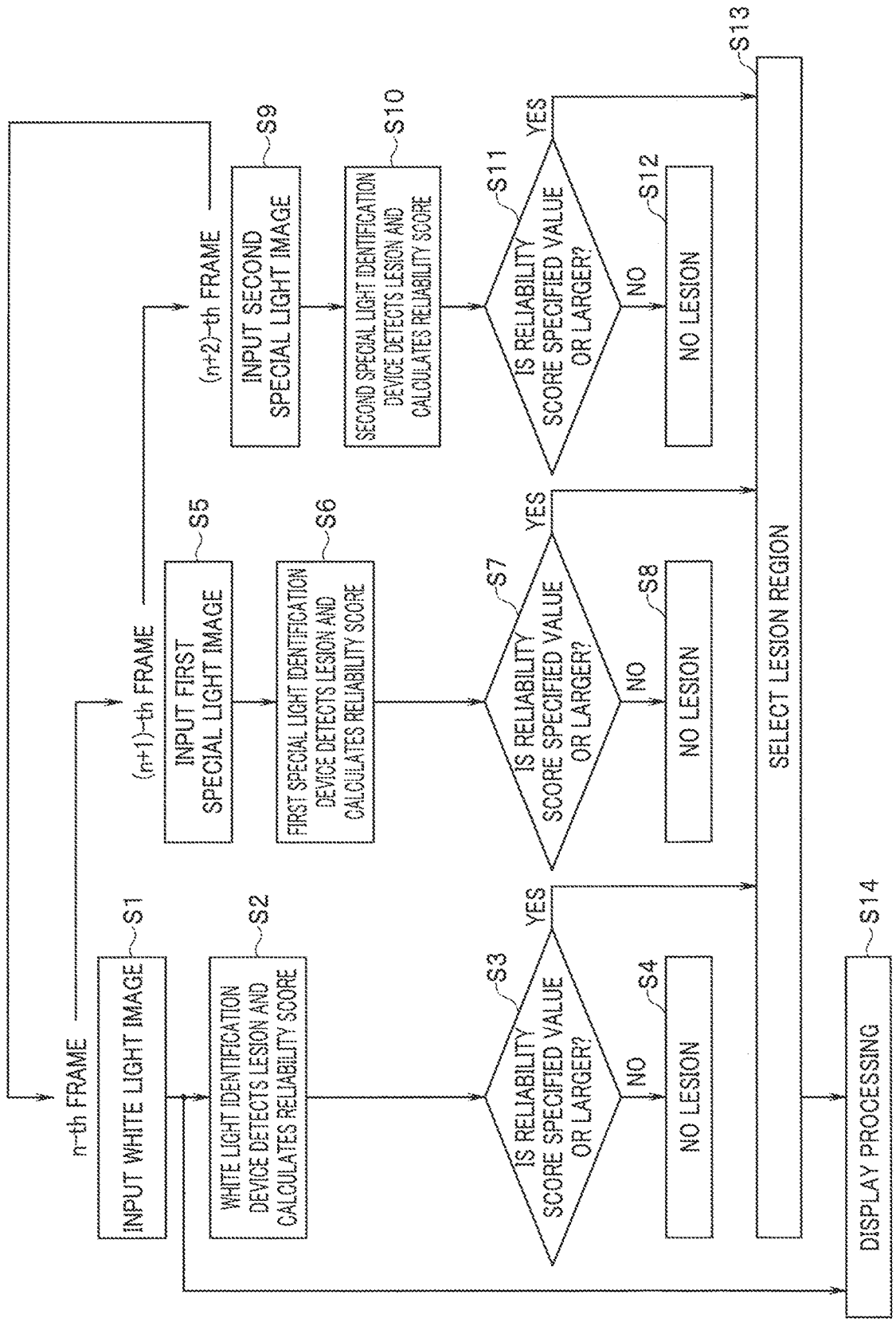
FIG. 6 is a flowchart showing processing of an endoscope processor according to the above first embodiment.

FIG. 6 is a flowchart showing the processing of the endoscope processor 4. FIG. 6 shows an example in which the endoscope processor 4 sequentially acquires the white light image, the first special light image and the second special light image, in every three frames.

For example, at an n-th frame (n is an integer), the light source device 3 emits white light, and the image pickup apparatus 21 acquires a white light image. The acquired white light image is inputted to the endoscope processor 4 (step S1). The inputted white light image is processed by the image processing unit 41, and then is sent to the white light identification device 42 and the display processing unit 46.

The white light identification device 42 detects a lesion candidate region from the white light image by the lesion identification device 4*c* in the white light identification device 42, and also calculates a reliability score for each detected lesion candidate region (step S2).

In a case where the lesion candidate region has been detected, the control unit 48 determines whether or not the reliability score calculated by the white light identification device 42 is a specified value (threshold value) or larger for each lesion candidate region (step S3). Note that in a case where the lesion candidate region is not detected, the control unit 48 skips the processing of step S3 and proceeds to step S4.

In a case where the lesion candidate region is not detected or it is determined that the reliability scores of all the lesion candidate regions are smaller than the specified value, the control unit 48 determines that there is no lesion (step S4), and does not cause the white light identification device 42 to transmit the lesion candidate region to the lesion region selection unit 45 even if there is a lesion candidate region.

In a case where it is determined that there is a lesion candidate region, the reliability score of which is the specified value or larger, the control unit 48 causes the white light identification device 42 to transmit the lesion candidate region to the lesion region selection unit 45.

In a subsequent (n+1)-th frame, the light source device 3 emits the first special light which emphasizes a surface layer blood vessel, and the image pickup apparatus 21 acquires the first special light image. The acquired first special light image is inputted to the endoscope processor 4 (step S5). The inputted first special light image is processed by the image processing unit 41, and then is sent to the first special light identification device 43.

The first special light identification device 43 detects a lesion candidate region from the first special light image by the lesion identification device 4*c* in the first special light identification device 43, and also calculates a reliability score for each detected lesion candidate region (step S6).

In a case where the lesion candidate region has been detected, the control unit 48 determines whether or not the reliability score calculated by the first special light identification device 43 is a specified value (threshold value) or larger for each lesion candidate region (step S7). Note that in a case where the lesion candidate region is not detected, the control unit 48 skips the processing of step S7 and proceeds to step S8.

In a case where the lesion candidate region is not detected or it is determined that the reliability scores of all the lesion candidate regions are smaller than the specified value, the control unit 48 determines that there is no lesion (step S8), and does not cause the first special light identification device 43 to transmit the lesion candidate region to the lesion region selection unit 45 even if there is a lesion candidate region.

In a case where it is determined that there is a lesion candidate region, the reliability score of which is the specified value or larger, the control unit 48 causes the first special light identification device 43 to transmit the lesion candidate region to the lesion region selection unit 45.

In the subsequent (n+2)-th frame, the light source device 3 emits the second special light which emphasizes a middle layer blood vessel, and the image pickup apparatus 21 acquires the second special light image. The acquired second special light image is inputted to the endoscope processor 4 (step S9). The inputted second special light image is processed by the image processing unit 41, and then is sent to the second special light identification device 44.

The second special light identification device 44 detects a lesion candidate region from the second special light image by the lesion identification device 4*c* in the second special light identification device 44, and also calculates a reliability score for each detected lesion candidate region (step S10).

In a case where the lesion candidate region has been detected, the control unit 48 determines whether or not the reliability score calculated by the second special light identification device 44 is a specified value (threshold value) or larger for each lesion candidate region (step S11). Note that in a case where the lesion candidate region is not detected, the control unit 48 skips the processing of step S11 and proceeds to step S12.

In a case where the lesion candidate region is not detected or it is determined that the reliability scores of all the lesion candidate regions are smaller than the specified value, the control unit 48 determines that there is no lesion (step S12), and does not cause the second special light identification device 44 to transmit the lesion candidate region to the lesion region selection unit 45 even if there is a lesion candidate region.

In a case where it is determined that there is a lesion candidate region, the reliability score of which is the specified value or larger, the control unit 48 causes the second special light identification device 44 to transmit the lesion candidate region to the lesion region selection unit 45.

In a case where it is determined in step S3 that the reliability score is the specified value or larger, in a case where it is determined in step S7 that the reliability score is the specified value or larger, or in a case where it is determined in step S11 that the reliability score is the specified value or larger, the lesion region selection unit 45 selects a region for display from the lesion candidate regions obtained based on the images of the n-th to (n+2)-th frames (step S13). Here, the lesion region selection unit 45, for example, aligns all the inputted lesion candidate regions as described above, then merges the aligned regions, and sets the aligned regions as the region for display. In other words, all of the lesion candidate regions processed by the lesion region selection unit 45 are regions, the reliability scores of which are the specified value or larger.

Subsequently, the display processing unit 46 synthesizes an image by aligning the regions for display and superimposing the aligned regions on the white light image (first image information), and generates image information for display (step S14). The generated image information for display is outputted from the endoscope processor 4 to the monitor 5, and the display image is displayed on the monitor screen of the monitor 5.

After the (n+2)-th frame has been processed, the subsequent (n+3)-th, (n+4)-th and (n+5)-th frames are processed in the same way as the above-described n-th, (n+1)-th and (n+2)-th frames, and the subsequent frames are processed in the same way.

Note that when image information for display is generated once every three frames and the display image is displayed, a frame rate decreases. Then, in order that the frame rate does not decease, it is also acceptable to sequentially display a display image based on the images of the n-th to (n+2)-th frames, next display a display image based on images of (n+1)-th to (n+3)-th frames, and further display a display image based on the images of (n+2)-th to (n+4)-th frames and so on.

According to the first embodiment as in the above, the endoscope device is configured to detect a plurality of lesion candidate regions from a plurality of pieces of image information acquired by irradiation with a plurality of types of illumination light having different spectra including white light, select a region for display from the plurality of lesion candidate regions, and generate image information for display, in which the selected region for display is superimposed on the white light image; and can realize a function of detecting a lesion that may be overlooked with white light. The operator can visually recognize, in the white light image, the details of the subject, which are dark and difficult to see in a special light image.

Furthermore, the endoscope device uses a plurality of types of second illumination light, that is, the first special light and the second special light, and can detect, for example, lesions, the depths from the mucosal surface of which are different, from the respective images.

At the time, when illumination light for NBI (narrow band imaging) is used as the second illumination light, the blood vessel can be emphasized. When illumination light for RDI (red dichromatic imaging) is used as the second illumination light, it is possible to detect a lesion while penetrating an obstacle such as a residue, bile or blood.

The endoscope device also selects the region for display of the lesion candidate based on the reliability score, and thereby can enhance detection accuracy for the lesion. At the time, the endoscope device selects the region for display from a region in which the reliability score is higher than the threshold value, and thereby, the operator can concentrate on the observation of the region which is highly likely to contain the lesion.

The endoscope device changes which illumination light-related image information is used for selecting the lesion candidate region that has been detected as the region for display, corresponding to the organ that is the observation target site of the subject, and thereby can perform accurate computer-aided image diagnosis (CAD: computer aided detection/diagnosis) corresponding to lesions for which a diagnosis method has been established.

The endoscope device firstly aligns the lesion candidate regions detected from the plurality of pieces of image information according to the results of the motion detection, then selects a region for display, and generates the image information for display; and thereby can perform marker display or the like at an appropriate position on the white light image, even in a case where there is movement among a plurality of images.

Thus, the endoscope device selects a region for display of a lesion candidate by comprehensive determination based on a plurality of types of images including a white light image and a special light image, and performs computer-aided image diagnosis in which the region for display is displayed on a white light image with a marker or the like; and thereby overlooking of the lesion is reduced, the lesion is easily found, and the scale of the lesion is accurately and easily grasped. Thereby, it becomes easier for the operator to view the display image and make a diagnosis.

Second Embodiment

Figure 7:
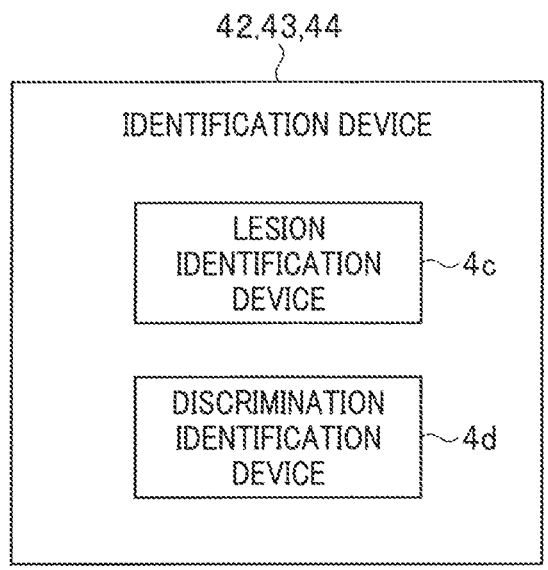
FIG. 7 is a block diagram showing a configuration example of an identification device according to a second embodiment of the present invention.
Figure 8:
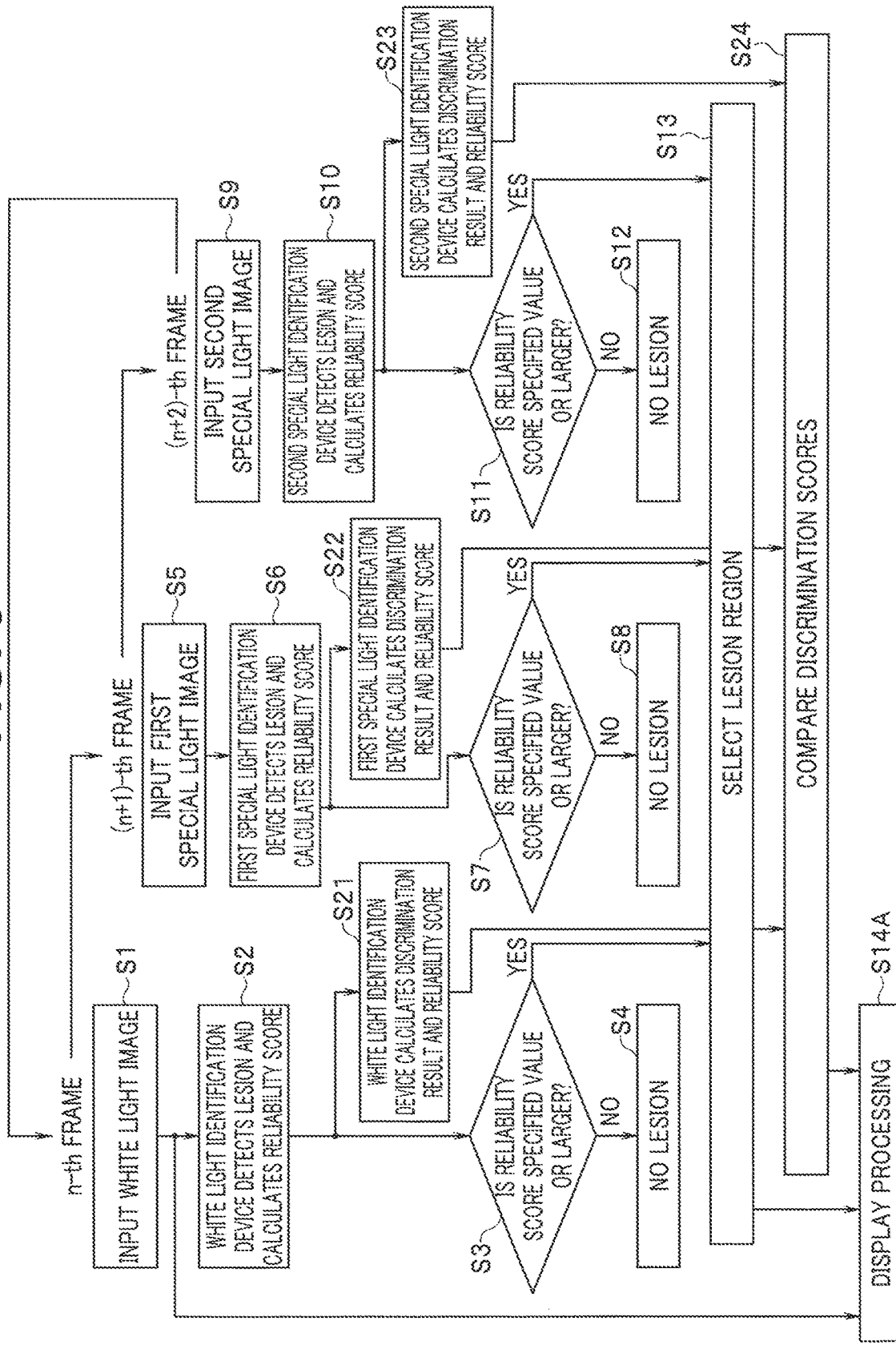
FIG. 8 is a flowchart showing processing of an endoscope processor according to the above second embodiment.

FIG. 7 and FIG. 8 show a second embodiment of the present invention, and FIG. 7 is a block diagram showing a configuration example of the identification devices 42, 43 and 44. In the second embodiment, portions similar to the portions of the above described first embodiment are denoted by the same reference characters; and description of the portions will be omitted as appropriate, and only different points will be mainly described.

In the present embodiment, in addition to the display of the lesion candidate region in the first embodiment described above, a discrimination result for the lesion candidate region is displayed.

As shown in FIG. 7, each of the white light identification device 42, the first special light identification device 43, and the second special light identification device 44 of the present embodiment includes a discrimination identification device 4d in addition to the lesion identification device 4c.

The discrimination identification device 4d includes, for example, an AI that has learned lesion images. The discrimination identification device 4d discriminates the type of each lesion with respect to one or more lesion candidate regions that have been detected by the lesion identification device 4c, and calculates a reliability score of the type of lesion, which has been discriminated.

The discrimination identification device 4d identifies that the lesion candidate region is, for example, a "polyp", and calculates that the reliability score of being a "polyp" is, for example, "60%".

However, the discrimination identification device 4d does not necessarily output one discrimination result, and may output discrimination results for a plurality of types of lesions, such as "the reliability score of being a polyp is 60%," "the reliability score of being ulcerative colitis is 10%", and "the reliability score of being Crohn's disease is less than 1%".

Note that in FIG. 7, the lesion identification device 4c and the discrimination identification device 4d are described as separate blocks, but one AI may be configured to function as both blocks.

FIG. 8 is a flowchart showing the processing of the endoscope processor 4. In FIG. 8, portions different from the portions in FIG. 6 will be described below.

The white light identification device 42 subjects the white light image which has been acquired in the n-th frame to the processing of step S2, and also the discrimination identification device 4d in the white light identification device 42 discriminates the lesion candidate region which has been detected by the lesion identification device 4c in the white light identification device 42. The discrimination identification device 4d calculates a discrimination result of the lesion candidate region, and a reliability score for the discrimination result (step S21). Note that in a case where the lesion candidate region is not detected by the lesion identification device 4c, the discrimination identification device 4d skips the processing of step S21.

The first special light identification device 43 subjects the first special light image acquired in the (n+1)-th frame to the processing of step S6, and the discrimination identification device 4d in the first special light identification device 43 discriminates the lesion candidate region detected by the lesion identification device 4c in the first special light identification device 43. The discrimination identification device 4d calculates a discrimination result of the lesion candidate region, and a reliability score for the discrimination result (step S22). Note that in a case where the lesion candidate region is not detected by the lesion identification device 4c, the discrimination identification device 4d skips the processing of step S22.

The second special light identification device 44 subjects the second special light image acquired in the (n+2)-th frame to the processing of step S10, and the discrimination identification device 4d in the second special light identification device 44 discriminates the lesion candidate region detected by the lesion identification device 4c in the second special light identification device 44. The discrimination identification device 4d calculates a discrimination result of the lesion candidate region, and a reliability score for the discrimination result (step S23). Note that in a case where the lesion candidate region is not detected by the lesion identification device 4c, the discrimination identification device 4d skips the processing of step S23.

The lesion region selection unit 45 performs the processing of step S13; also compares the reliability score for the discrimination result obtained in step S21, the reliability score for the discrimination result obtained in step S22, and the reliability score for the discrimination result obtained in step S23; determines which discrimination result is to be displayed; and outputs the determined discrimination result to the display processing unit 46 (step S24).

Here, the lesion region selection unit 45 may determine, for example, a discrimination result in which the reliability score is highest, as the discrimination result to be displayed. The lesion region selection unit 45 may also determine several (that is, a plurality of) discrimination results in descending order of the reliability score as the discrimination results to be displayed, and may display the reliability scores, side by side with the discrimination results to be displayed.

The display processing unit 46 synthesizes an image by aligning the regions for display and superimposing the aligned regions on the white light image (first image information), further synthesizes an image which includes the discrimination result in the vicinity of the white light image, and generates image information for display (step S14A). The generated image information for display is outputted from the endoscope processor 4 to the monitor 5, and the display image is displayed on the monitor screen of the monitor 5. Thereby, the discrimination result 50b as shown in FIG. 5 is displayed.

According to the second embodiment, the endoscope device shows substantially the same effect as the effect of the first embodiment described above, and can reduce the variation of the diagnosis due to the subjectivity of the operator with respect to the type of lesion, because of being configured to discriminate the type of lesion and generate image information for display including the discrimination result.

Third Embodiment

Figure 9:
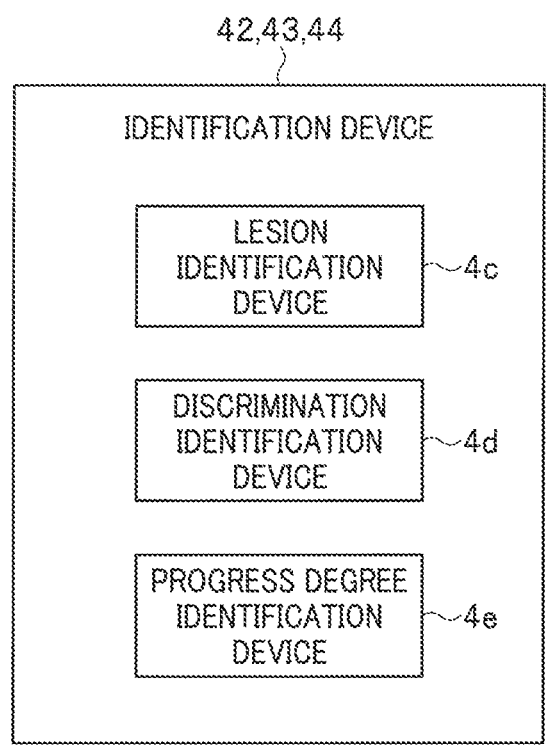
FIG. 9 is a block diagram showing a configuration example of an identification device according to a third embodiment of the present invention.
Figure 10:
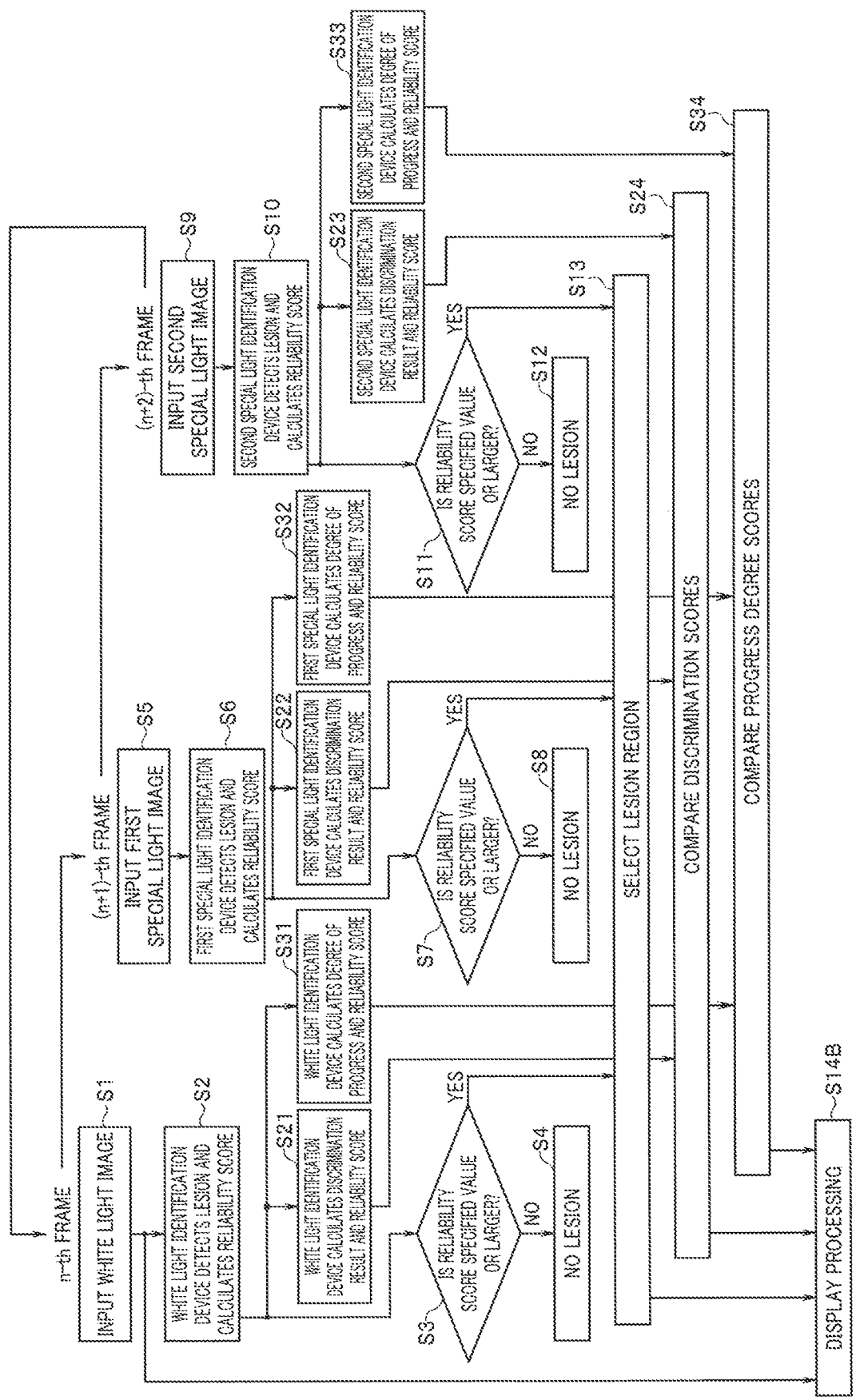
FIG. 10 is a flowchart showing processing of an endoscope processor according to the above third embodiment.

FIG. 9 and FIG. 10 show a third embodiment of the present invention, and FIG. 9 is a block diagram showing a configuration example of the identification devices 42, 43 and 44. In the third embodiment, portions similar to the portions of the above described first and second embodiments are denoted by the same reference characters; and description of the portions will be omitted as appropriate, and only different points will be mainly described.

The present embodiment is configured to display a degree of progress of the lesion, in addition to the display of the lesion candidate region and the discrimination result in the second embodiment described above.

As shown in FIG. 9, each of the white light identification device 42, the first special light identification device 43 and the second special light identification device 44 of the present embodiment includes a progress degree identification device 4e in addition to the lesion identification device 4c and the discrimination identification device 4d.

The progress degree identification device 4e includes, for example, an AI that has learned lesion images. The progress degree identification device 4e identifies the degree of progress of the lesion that has been discriminated by the discrimination identification device 4d with respect to the lesion candidate region, and calculates a reliability score of the degree of progress.

Note that in FIG. 9, the lesion identification device 4c, the discrimination identification device 4d and the progress degree identification device 4e are described as separate blocks, but one AI may be configured to function as three blocks.

In the endoscopic finding classification of a polyp (including cancer), for example, there are NICE (the narrow-band imaging international colorectal endoscopic) classification, JNET (the Japan NBI (narrow band imaging) expert team) classification, and the like.

In a case where the progress degree identification device 4e identifies the degree of progress of a polyp according to the NICE classification, for example, the progress degree identification device 4e identifies the degree of progress as any one of "NICE Type1", "NICE Type2" and "NICE Type3". "NICE Type1" indicates hyperplastic lesions, "NICE Type2" indicates adenoma to intramucosal cancer (so-called M cancer), and "NICE Type3" indicates submucosal invasive cancer (so-called SM cancer).

In endoscopic finding classification of ulcerative colitis, there are Mayo classification, Matts classification, UCEIS (ulcerative colitis endoscopic index of severity) classification and the like.

In a case where the progress degree identification device 4e identifies the degree of progress of ulcerative colitis according to the Mayo classification, for example, the progress degree identification device 4e identifies the degree of progress as any one of four grades of Mayo0 (grade 0), Mayo1 (grade 1), Mayo2 (grade 2) and Mayo3 (grade 3). Mayo0 is a grade that indicates a normal or inactive state (including remission). Mayo1 is a grade that indicates a mild symptom, and is generally a state in which redness, an unclear blood vessel image, or a mild hemorrhagic symptom is observed. Mayo2 is a grade that indicates a moderate symptom, and is generally a state in which marked redness, disappearance of a blood vessel image, a hemorrhagic symptom, adhesion of purulent secretion, a coarse mucous membrane, erosion, partial ulceration or the like is observed. Mayo3 is a grade that indicates a severe symptom (active stage), and is generally a state in which apparent spontaneous hemorrhage, edema, ulcer (including extensive ulceration) or the like is observed. The progress degree identification device 4e may also identify dysplasia associated with ulcerative colitis.

In the endoscopic finding classification of Crohn's disease, there are SESCD (simple endoscopic score for Crohn's disease) and the like. In a case where the progress degree identification device 4e identifies the degree of progress of Crohn's disease according to SESCD, the progress degree identification device 4e identifies the degree of progress as any one of "SESCD 0", "SESCD 1", "SESCD 2" and "SESCD 3".

Note that in a case where the lesion region selection unit 45 determines a plurality of discrimination results as discrimination results to be displayed in descending order of reliability score, the progress degree identification device 4e also identifies the degree of progress for each of the plurality of discrimination results.

FIG. 10 is a flowchart showing the processing of the endoscope processor 4. In FIG. 10, portions different from the portions in FIG. 8 will be described below.

The white light identification device 42 subjects the white light image which has been acquired in the n-th frame to the processes of step S2 and step S21, and also identifies the degree of progress for the lesion that has been discriminated by the discrimination identification device 4d in the white light identification device 42, with the progress degree identification device 4e in the white light identification device 42. The progress degree identification device 4e calculates an identification result of the degree of progress, and a reliability score for the identified degree of progress (step S31). Note that in a case where the lesion candidate region is not detected by the lesion identification device 4c, the discrimination identification device 4d skips the processing of step S31.

The first special light identification device 43 subjects the first special light image which has been acquired in the (n+1)-th frame to the processes of step S6 and step S22, and also identifies the degree of progress for the lesion that has been discriminated by the discrimination identification device 4d in the first special light identification device 43, with the progress degree identification device 4e in the first special light identification device 43. The progress degree identification device 4e calculates an identification result of the degree of progress, and a reliability score for the identified degree of progress (step S32). Note that in a case where the lesion candidate region is not detected by the lesion identification device 4c, the discrimination identification device 4d skips the processing of step S32.

The second special light identification device 44 subjects the second special light image which has been acquired in the (n+2)-th frame to the processes of step S10 and step S23, and also identifies the degree of progress for the lesion that has been discriminated by the discrimination identification device 4d in the second special light identification device 44, with the progress degree identification device 4e in the second special light identification device 44. The progress degree identification device 4e calculates an identification result of the degree of progress, and a reliability score for the identified degree of progress (step S33). Note that in a case where the lesion candidate region is not detected by the lesion identification device 4c, the discrimination identification device 4d skips the processing of step S33.

The lesion region selection unit 45 performs the processes of step S13 and step S24, determines the degree of progress corresponding to the discrimination result that has been determined to be displayed in step S24, on the basis of the reliability score, and outputs the determined degree of progress to the display processing unit 46 (step S34).

For example, in a case where the discrimination result to be displayed is ulcerative colitis, suppose that such a reliability score is 30% that the degree of progress is Mayo0 (grade 0), such a reliability score is 60% that the degree of progress is Mayo1 (grade 1), such a reliability score is 10% that the degree of progress is Mayo2 (grade 2), and such a reliability score is smaller than 1% that the degree of progress is Mayo3 (grade 3). At the time, the lesion region selection unit 45 determines, for example, "Mayo1", the reliability score of which is highest, as the degree of progress, and outputs the degree of progress to the display processing unit 46.

The display processing unit 46 synthesizes an image by aligning the regions for display and superimposing the aligned regions on the white light image (first image information), further synthesizes an image which includes the discrimination result and the degree of progress in the vicinity of the white light image, and generates image information for display (step S14B). The generated image information for display is outputted from the endoscope processor 4 to the monitor 5, and the display image is displayed on the monitor screen of the monitor 5. Thereby, the discrimination result 50b and the degree of progress 50c as shown in FIG. 5 are displayed.

According to the third embodiment, the endoscope device shows substantially the same effects as the effects of the first and second embodiments described above, and can reduce the variation of the diagnosis due to the subjectivity of the operator with respect to the degree of progress of a lesion, because of being configured to identify the degree of progress of the lesion and generate image information for display including the degree of progress.

Note that in the above description, the case has been mainly described where the present invention is the endoscope processor and the endoscope device including the endoscope processor, but the present invention is not limited to the case. The present invention may be a method of generating a diagnostic image, which performs processing similar to the processing of the endoscope processor. The present invention may also be a computer program for causing a computer to perform the same processing as the endoscope processor performs; a non-transitory computer-readable recording medium that records the computer program; or the like.

Furthermore, the present invention is not limited to the above-described embodiments as the embodiments are, and can be embodied by such modification of components within such a range as not to depart from the gist of the invention, in an implementation stage. Various aspects of the invention can be formed by appropriate combinations of a plurality of components that are disclosed in the above embodiments. For example, some components may be deleted from all the components shown in the embodiments. Furthermore, components in different embodiments may be appropriately combined. Thus, it goes without saying that various modifications and applications can be made without departing from the gist of the invention.

What is claimed is:

1. An endoscope processor comprising:
a processor configured to:
detect a first region of a lesion candidate from first image information which is acquired by irradiation with first illumination light;
detect a second region of a lesion candidate from second image information acquired by irradiation with second illumination light having a different spectrum from the first illumination light;

calculate a plurality of reliability scores including a reliability score of the first region and a reliability score of the second region;

select a region for display of the lesion candidate out of the first region and the second region, corresponding to an observation target site of a subject, wherein the selecting of the region for display is based on the plurality of reliability scores; and generate image information for display, in which the region for display is superimposed on the first image information.

2. The endoscope processor according to claim 1, wherein the first illumination light is white light.

3. The endoscope processor according to claim 1, wherein the processor is configured to detect a plurality of second regions from a plurality of pieces of second image information acquired by irradiation with a plurality of types of second illumination light having different spectra from each other; and select the region for display from among the first region and the plurality of second regions.

4. The endoscope processor according to claim 3, wherein the plurality of types of second illumination light include at least one of illumination light for NBI (narrow band imaging) and illumination light for RDI (red dichromatic imaging).

5. The endoscope processor according to claim 1, wherein the processor is configured to select the region for display out of the first region and the second region in which the reliability score is higher than a threshold value.

6. The endoscope processor according to claim 5, wherein the processor is configured to select a region in which the reliability score is highest in the first region and the second region as the region for display, in a case where a position of the first region and a position of the second region overlap each other.

7. The endoscope processor according to claim 5, wherein the processor is configured to select a region in which the first region and the second region are merged as the region for display, in a case where a position of the first region and a position of the second region overlap each other.

8. The endoscope processor according to claim 3, wherein the processor is configured to calculate the reliability score of each of the plurality of second regions.

9. The endoscope processor according to claim 8, wherein the processor is configured to multiply the plurality of reliability scores by a plurality of weight coefficients corresponding to the observation target site of the subject, respectively, and select the region for display, based on the plurality of reliability scores that are multiplied by the plurality of weight coefficients, respectively.

10. The endoscope processor according to claim 9, wherein the observation target site is an organ, and the processor sets the plurality of weight coefficients corresponding to a type of the organ.

11. The endoscope processor according to claim 9, wherein the processor automatically switches the plurality of weight coefficients, corresponding to the observation target site.

12. The endoscope processor according to claim 1, wherein the processor is configured to detect motions of the first image information and the second image information, and align the first region and the second region according to a result of the detected motions, then select the region for display, and generate the image information for display.

13. The endoscope processor according to claim 1, wherein the processor is configured to discriminate a type of lesion in the region for display, and generate the image information for display including a discrimination result.

14. The endoscope processor according to claim 13, wherein the processor is configured to identify a degree of progress of the lesion obtained as the discrimination result, and generate the image information for display including the degree of progress.

15. An endoscope device comprising:

a light source device that can emit a plurality of types of illumination light, which include first illumination light and second illumination light having a different spectrum from the first illumination light;

an endoscope that includes an image pickup apparatus configured to acquire first image information on the first illumination light radiated from the light source device and acquire second image information on the second illumination light radiated from the light source device;

an endoscope processor that includes a processor configured to detect a first region of a lesion candidate from the first image information, detect a second region of a lesion candidate from the second image information, calculate a plurality of reliability scores including a reliability score of the first region and a reliability score of the second region, select a region for display of the lesion candidate out of the first region and the second region, corresponding to an observation target site of a subject, wherein the selecting of the region for display is based on the plurality of reliability scores, and generate image information for display, in which the region for display is superimposed on the first image information; and a monitor configured to display the image information for display.

16. A method of generating a diagnostic image comprising:

detecting a first region of a lesion candidate from first image information that is acquired by irradiation with first illumination light;

detecting a second region of a lesion candidate from second image information acquired by irradiation with second illumination light having a different spectrum from the first illumination light;

calculating a plurality of reliability scores including a reliability score of the first region and a reliability score of the second region;

selecting a region for display of the lesion candidate out of the first region and the second region, corresponding to an observation target site of a subject, wherein the selecting of the region for display is based on the plurality of reliability scores; and generating image information for display, in which the region for display is superimposed on the first image information.

17. The method of generating a diagnostic image according to claim 16, further comprising:

detecting a plurality of second regions from a plurality of pieces of second image information acquired by irradiation with a plurality of types of second illumination light having different spectra from each other;

calculating the reliability score of each of the plurality of second regions;

multiplying the plurality of reliability scores by a plurality of weight coefficients corresponding to the observation target site of the subject, respectively; and selecting the region for display from among the first region and the plurality of second regions, based on the plurality of reliability scores that are multiplied by the plurality of weight coefficients, respectively.

18. The method of generating a diagnostic image according to claim 17, wherein the observation target site is an organ, and the plurality of weight coefficients are set, corresponding to a type of the organ.

19. The method of generating a diagnostic image according to claim 17, further comprising:

automatically switching the plurality of weight coefficients, corresponding to the observation target site.

20. Non-transitory computer-readable storage medium storing instructions that cause a computer to at least perform a method of generating a diagnostic image comprising:

detecting a first region of a lesion candidate from first image information that is acquired by irradiation with first illumination light;

detecting a second region of a lesion candidate from second image information acquired by irradiation with second illumination light having a different spectrum from the first illumination light;

calculating a plurality of reliability scores including a reliability score of the first region and a reliability score of the second region;

selecting a region for display of the lesion candidate out of the first region and the second region, corresponding to an observation target site of a subject, wherein the selecting of the region for display is based on the plurality of reliability scores; and generating image information for display, in which the region for display is superimposed on the first image information.

\* \* \* \* \*